(12) United States Patent
Lee et al.

(10) Patent No.: US 10,124,599 B1
(45) Date of Patent: Nov. 13, 2018

(54) PRINT HEAD WITH QUICK RELEASE MECHANISM (71) Applicants: XYZPRINTING, INC., New Taipei (TW); KINPO ELECTRONICS, INC., New Taipei (TW)

(72) Inventors: Yang-Teh Lee, New Taipei (TW); Shih-Wei Huang, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/630,671

(22) Filed: Jun. 22, 2017

(30) Foreign Application Priority Data

May 9, 2017 (CN) .......................... 2017 1 0322419

(51) Int. Cl.
*B41J 2/335* (2006.01)
*B41J 2/325* (2006.01)
*B41J 21/04* (2006.01)
*B41J 2/355* (2006.01)
*B41J 2/17* (2006.01)

(52) U.S. Cl.
CPC ........... *B41J 2/33575* (2013.01); *B41J 2/325* (2013.01); *B41J 2/3354* (2013.01); *B41J 2/3551* (2013.01); *B41J 21/04* (2013.01); *B41J 2/1714* (2013.01); *B41J 2202/15* (2013.01); *B41J 2202/19* (2013.01); *B41J 2202/31* (2013.01)

(58) Field of Classification Search
CPC .. B41J 2202/19; B41J 2202/15; B41J 2/1714; A01B 12/006
See application file for complete search history.

(56) References Cited

U.S. PATENT DOCUMENTS

2016/0031159 A1 2/2016 Church et al.
2016/0236413 A1 8/2016 Armani et al.

FOREIGN PATENT DOCUMENTS

CN 204658954 U 9/2015
CN 205112420 U 3/2016

OTHER PUBLICATIONS

Search Report dated Jan. 29, 2018 of the corresponding European patent application No. 17178107.3.

*Primary Examiner* — Lamson Nguyen
(74) *Attorney, Agent, or Firm* — Chun-Ming Shih; HDLS IPR Services (57) ABSTRACT

A quick release print head includes a heating block, a nozzle tube and a connecting tube. The nozzle tube is inserted in the heating block. One end of the nozzle tube has a nozzle and the other end is extended with an extension tube exposed to the heating block. The connecting tube is connected with the extension tube. Whereby, the extension tube extended from the nozzle tune is exposed to the heating block so that the nozzle tube disposed near the heating block cannot be disassembled. Thus a process of replacing components by heating a nozzle can be bypassed, and advantages of quick disassembly and easy maintenance of the print head can be achieved.

15 Claims, 8 Drawing Sheets

PRINT HEAD WITH QUICK RELEASE MECHANISM

BACKGROUND OF THE INVENTION

Field of the Invention

The present invention generally relates to a print head, and more particular, to a print head with quick release mechanism.

Description of Prior Art

Figure 1:
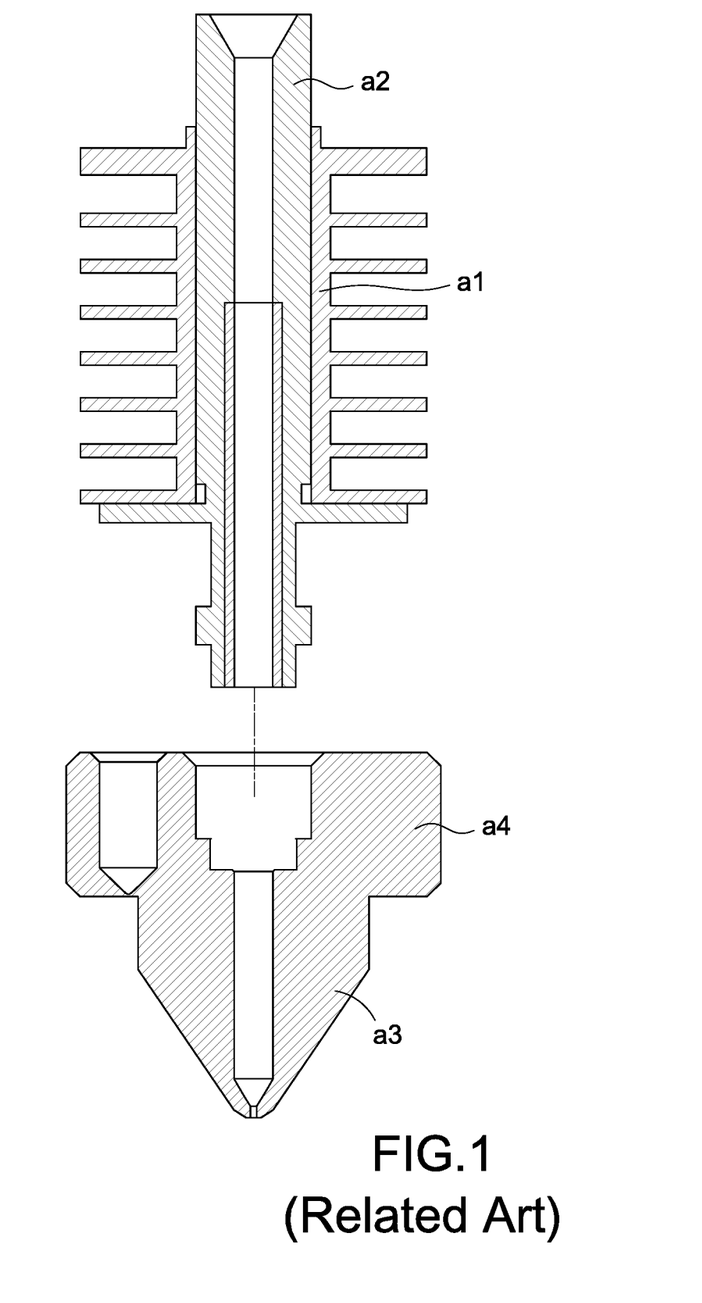
FIG. 1 is a cross sectional schematic view of a first embodiment of a print head of prior art.
Figure 2:
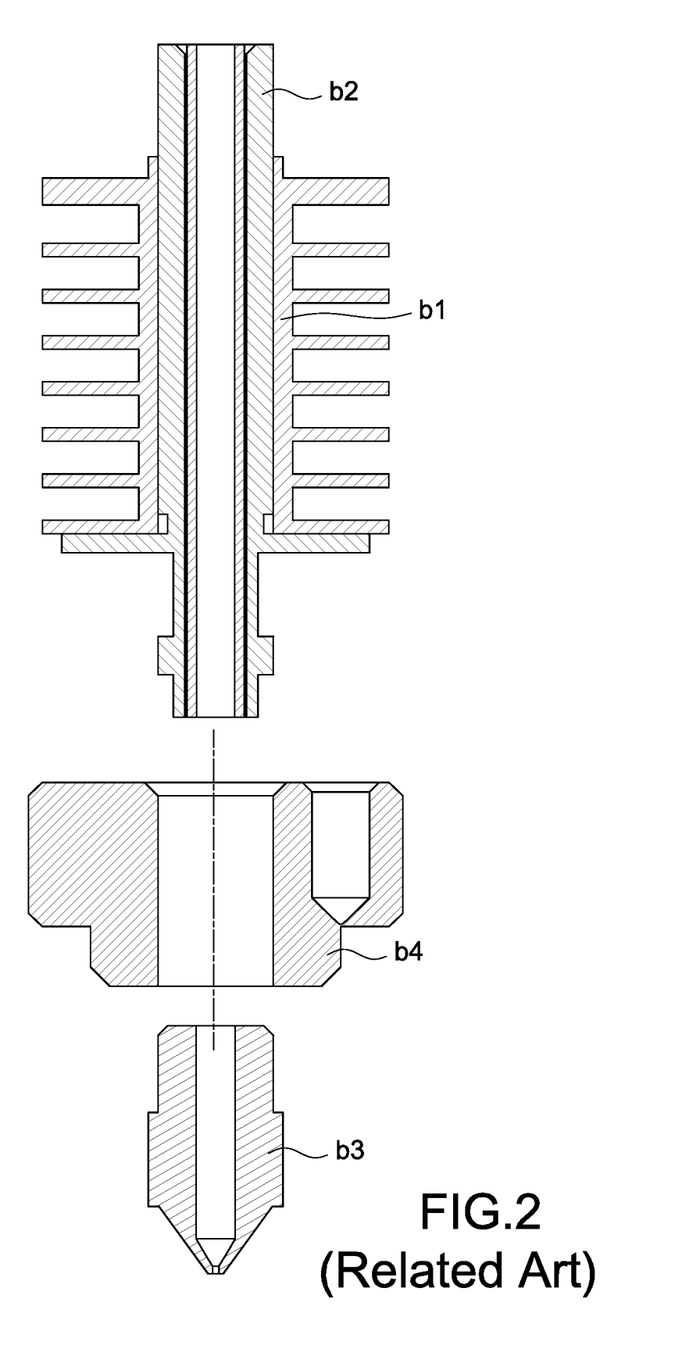
FIG. 2 is a cross sectional schematic view of a second embodiment of a print head of prior art.

In a traditional three-dimensional printing machine, print materials are usually melted by a print head and then stacked on a platform, wherein a traditional print head is usually composed of a nozzle, a heating block, a throat tube, and a heat sink etc. As shown in FIG. 1, it depicts a first embodiment of a traditional print head. A heat sink a1 is sleeved at an end of a throat tube a2; a nozzle a3 and a heating block a4 are integrally formed and assembled at another end of the throat tube a2. As shown in FIG. 2, it depicts a second embodiment of a traditional print head. A heat sink b1 is sleeved at an end of a throat tube b2; a nozzle b3 is assembled at another end of the throat tube b2, and a heating block b4 is sleeved on the nozzle b3.

However, as junctions of assembly of the above traditional print heads are located between the nozzle a3, b3 and the throat tube a2, b2, and cooling print materials are solidified and filled in the nozzle a3, b4 so that clogging which needs to be eliminated is often occurred at the intersection of the nozzle a3, b3 and the throat tube 2a, b2. Therefore, when the above traditional print head needs to be replaced or repaired, solidified printed material must be melt by heating the nozzle a3, b3 for excluding clogging of nozzle or replacing the nozzle. As a result, the nozzle is not easy to be disassembled, and the disassembly after heating is more dangerous for users.

In view of the above drawbacks, the Inventor proposes the present invention based on his expert knowledge and elaborate researches in order to solve the problems of prior art.

SUMMARY OF THE INVENTION

Accordingly, an object of the present invention is to provide a print head with quick release mechanism, in which one end of the nozzle tube has extended with an extension tube exposed to the heating block so that the nozzle tube disposed near the heating block cannot be disassembled. Thus a process of replacing components by heating a nozzle at high temperature can be bypassed, and advantages of quick disassembly and easy maintenance of the print head of the present invention will be achieved.

In order to achieve the object mentioned above, the present invention provides a print head including a heating block, a nozzle tube and a connecting tube. The nozzle tube is inserted in the heating block. One end of the nozzle tube has a nozzle and the other end extended with an extension tube exposed to the heating block. The connecting tube is connected with the extension tube.

In the above, the nozzle tube is made of stainless steel (SUS303) so that the nozzle tube can print materials at high temperature (higher than 300 degrees) and metal materials.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Please refer to FIG. 3 to FIG. 6, the present invention provides a first embodiment of a print head with a quick release mechanism. The print head 10 mainly includes a heating block 1, a nozzle tube 2 and a connecting tube 3.

Figure 6:
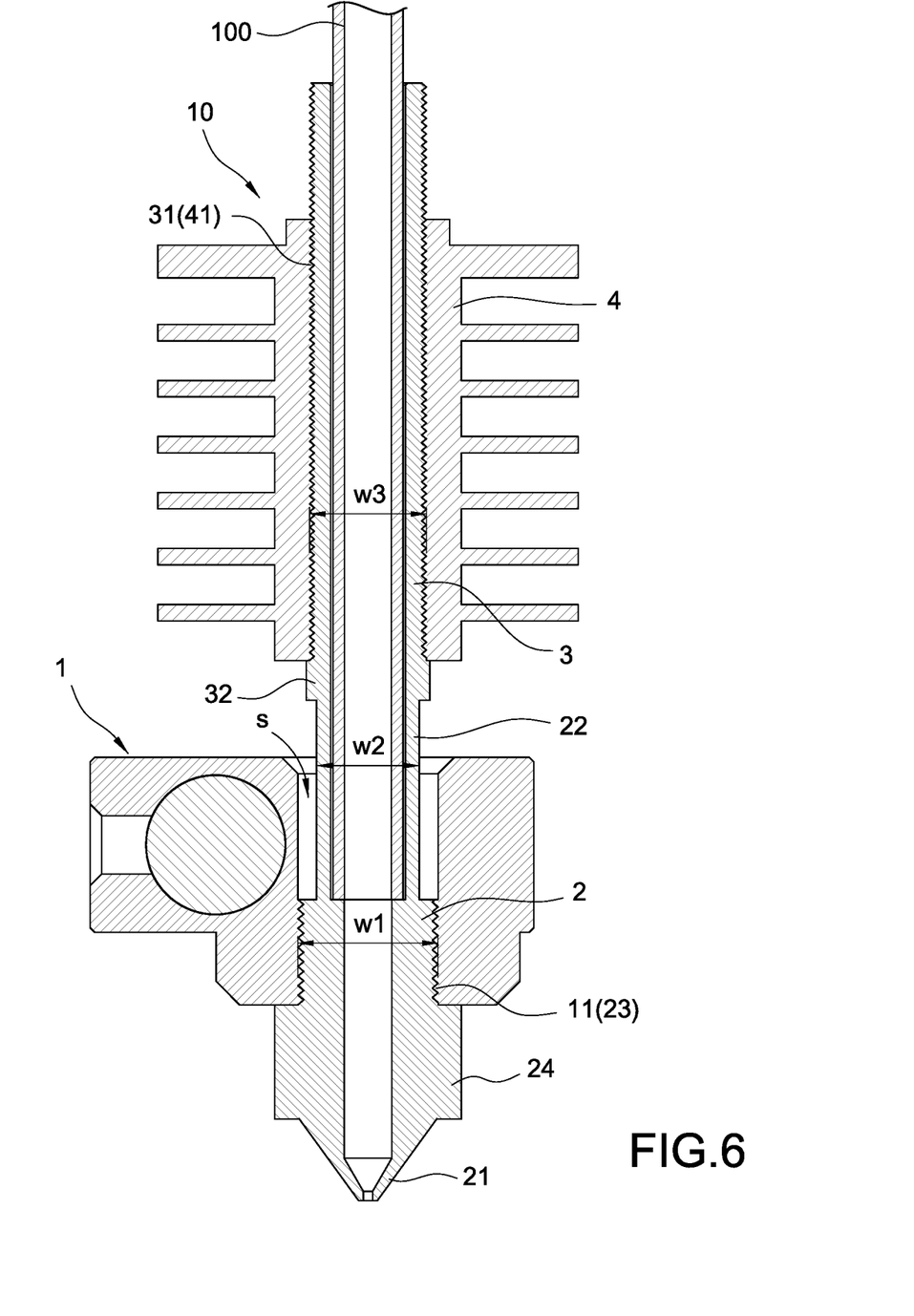
FIG. 6 is a cross sectional schematic view of a first embodiment of a print head of the present invention.

As shown in FIG. 6, the print head 10 is applied in a printer (not shown). The printer has a material tube 100, and the material tube 100 is used to provide materials for printing.

Figure 3:
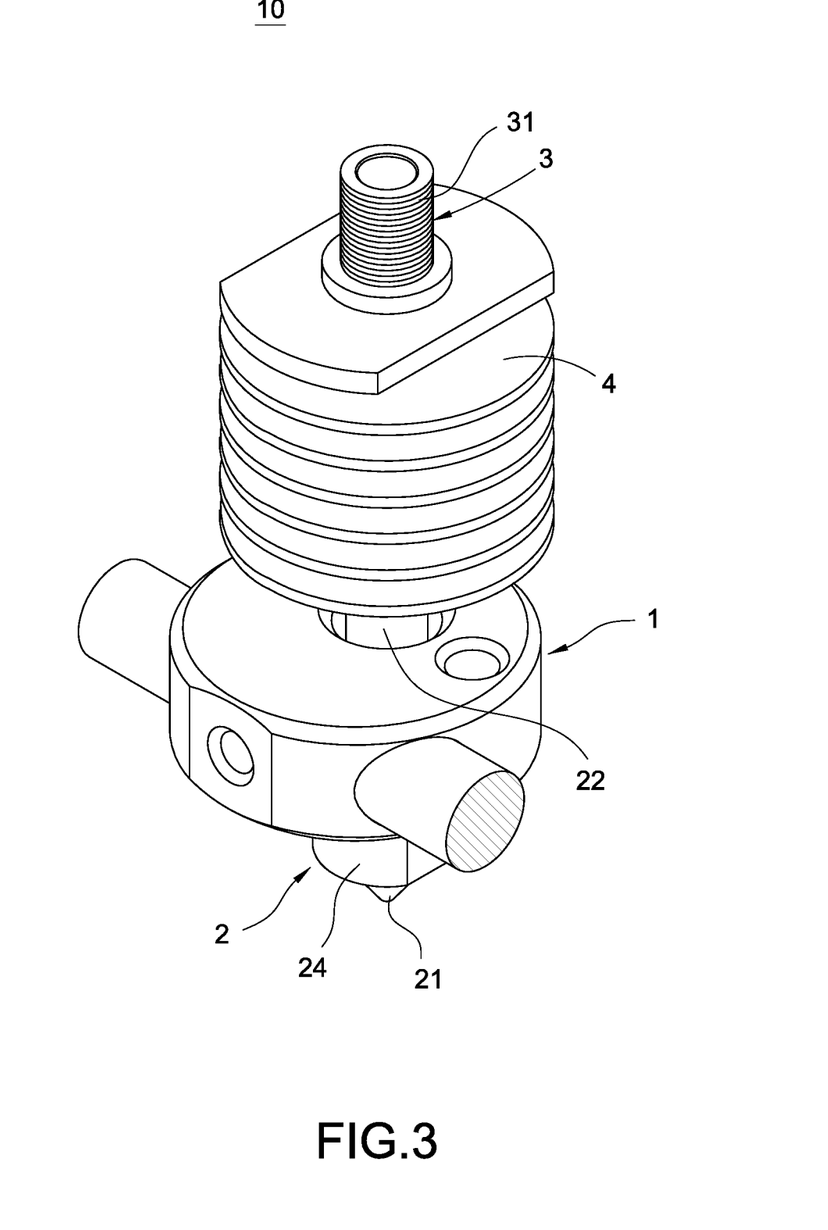
FIG. 3 is a perspective assembly schematic view of a first embodiment of a print head of prior art.
Figure 4:
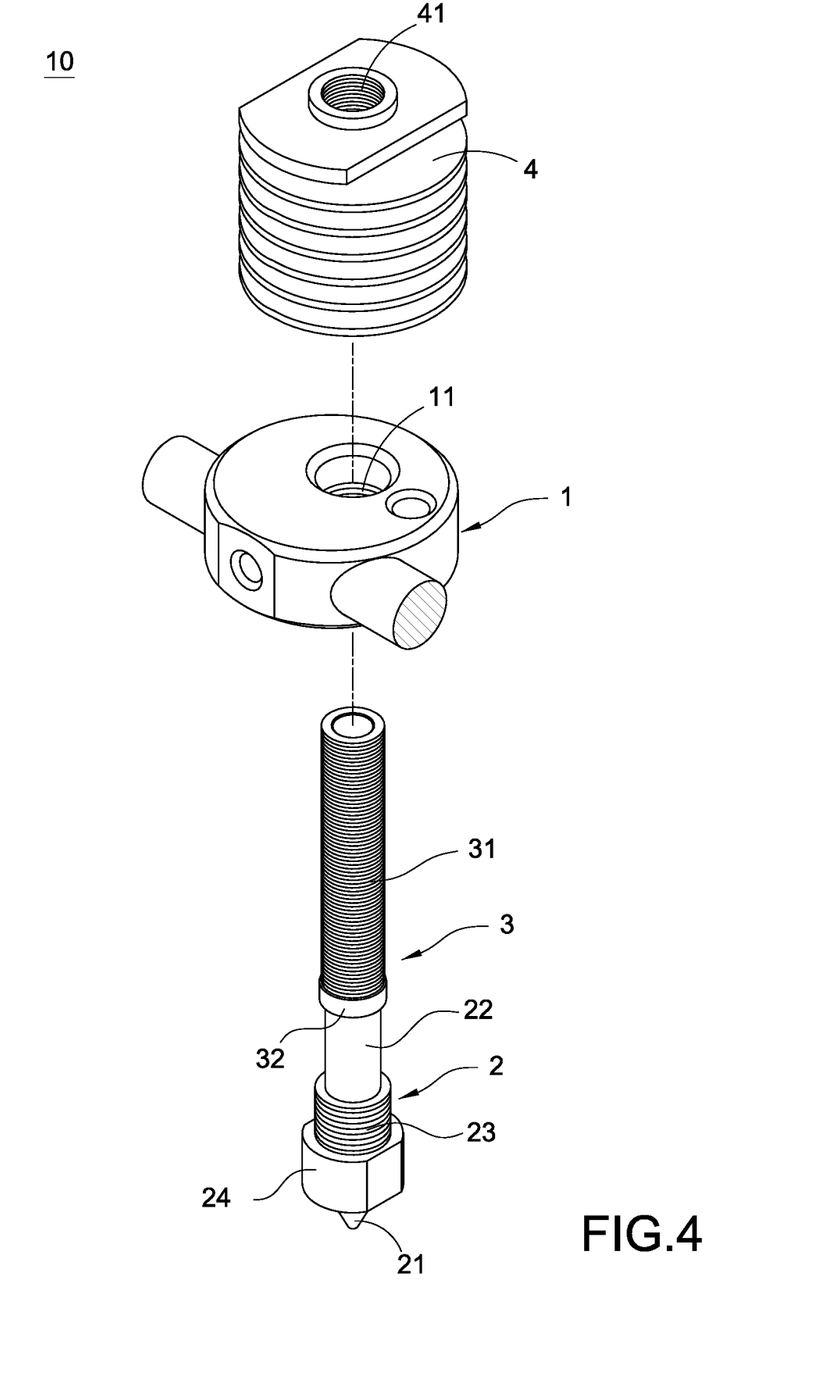
FIG. 4 is a perspective explosion schematic view of a first embodiment of a print head of the present invention.
Figure 5:
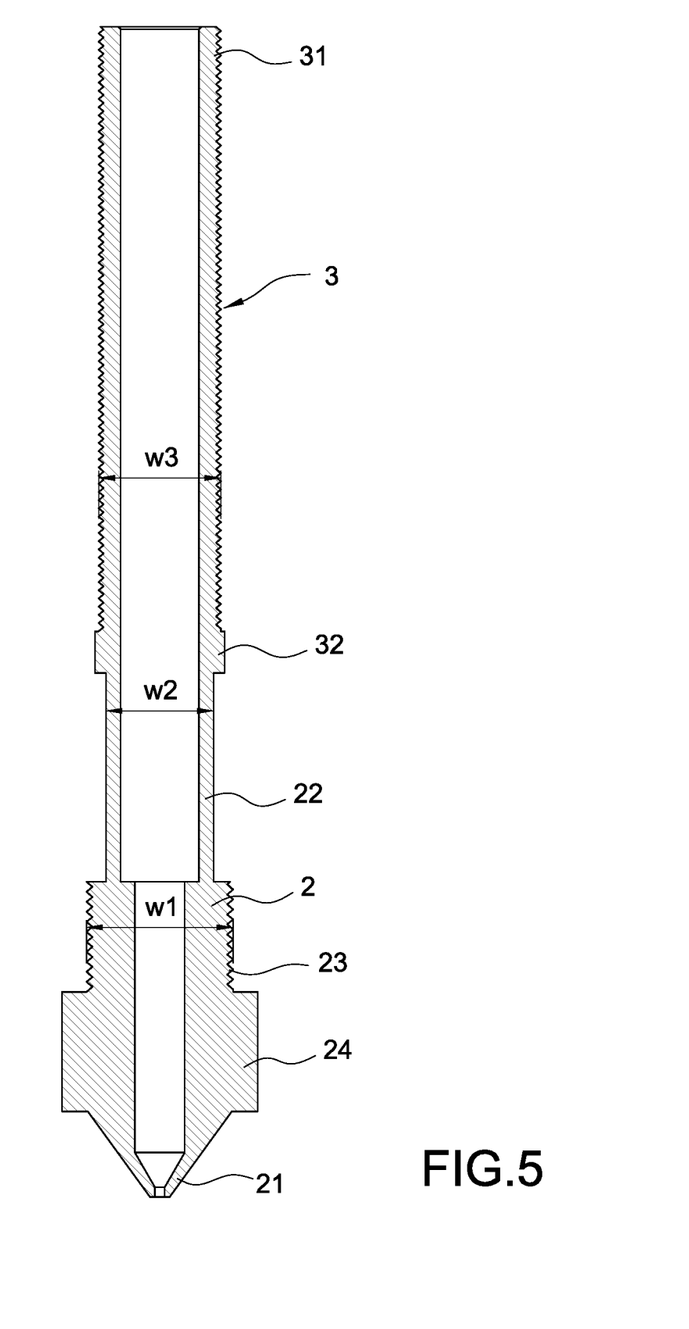
FIG. 5 is a cross sectional schematic view of a first embodiment of a nozzle tube and a connecting tube of the present invention.

As shown in FIG. 3, 4, and FIG. 6, the heating block 1 itself can be heated, and the heating block 1 approximately has a shape of a bushing and has a plurality of first internal threads 11 on an inner periphery.

As shown in FIG. 3 to FIG. 6, the nozzle tube 2 is inserted in the heating block 1. One end of the nozzle tube 2 has a nozzle 21 and the other end has extended with an extension tube 22 exposed to the heating block 1. The heating block 1 sleeves on an outer circumference of the extension tube 22, and an outer diameter w2 of the extension tube 22 is smaller than an outer diameter w1 of the nozzle tube 2 and an outer diameter w3 of the connecting tube 3 so that a spacing s will be formed between the heating block 1 and the extension tube 22. The heating block 1 is used for heating of the nozzle tube 2 and the nozzle 21 for thermal conduction, and the spacing s is used to delay the heat transfer to the extension tube 22.

More details are descripted as follows. An outer peripheral surface of the nozzle tube 2 has first external threads 23, and a protruding annular block 24 is provided at an outer peripheral edge of an intersection of the nozzle tube 2 and the nozzle 21. The first internal threads 11 and the first external threads 23 are screwed together for the nozzle tube 2 will be locked inside the heating block 1, and the protruding annular block 24 is blocked by the heating block 1.

Besides, nozzles on markets or nozzles of prior art are mostly copper nozzle. The temperature of printing of copper nozzles is about 200 degrees that leads to the nozzles cannot print materials at the temperature higher than 300 degrees (metal materials). However, the nozzle tube 2 of the present embodiment is made of stainless steel (SUS303); thus the nozzle tube 2 can print metal materials at high temperatures (higher than 300 degrees).

Please refer to FIG. 3 to FIG. 6, the connecting tube 3 is connected with the extension tube 22. Besides, an outer periphery of the connecting tube 3 has second outer threads 31, and the connecting tube 3 has an annular portion 32 neighboring an outer periphery of an end of the extension tube 22. In the present embodiment, the connecting tube 3 and the extension tube 22 are formed, but not limited to, as an integral part. As shown in FIG. 3, 4 and FIG. 6, the print head 10 further includes a heat sink set 4, and the heat sink set 4 sleeves on the connecting tube 3. Furthermore, an outer periphery of the heat sink set 4 has extended with a plurality of heat dissipating fins (not shown) for enhancing the heat dissipation of the connecting tube 3.

Further description is as follows. An inner periphery of the heat sink set 4 has second internal threads 41; the second outer threads 31 and the second internal threads 41 are screwed together so that the heat sink set 4 is locked at an outer of the connection pipe 3, and the annular portion 32 is blocked by the heat sink set 4.

Moreover, a helical direction of the first external threads 23 is opposite to a helical direction of the second external threads 31. Thus, in an unscrewing process of the heat sink set 4 and the connecting tube 3, the heating block 1 and the nozzle tube 2 will not be loosen but screwed more tightly because the threads has an opposite direction. Similarly, in an unscrewing process of the heating block 1 and the nozzle tube 2, the heat sink set 4 and the connecting tube 3 will not be loosen but screwed more tightly.

With referring to FIG. 3 to FIG. 6, an assembly and operating states of the print head 10 of the present invention, wherein the nozzle tube 2 is inserted in the heating block 1. One end of the nozzle tube 2 has a nozzle 21 and the other end has extended with an extension tube 22 exposed to the heating block 1. The connecting tube 3 is connected with the extension tube 22. Thereby, the nozzle tube 2 has integrally extended with an extension tube 22 exposed to the heating block 1 so that the nozzle tube 2 disposed near the heating block 1 cannot be disassembled. Thus a process of replacing components by heating a nozzle at high temperature can be bypassed, and advantages of quick disassembly and easy maintenance of the print head of the present invention will be achieved.

In the present embodiment, the connecting tube 3, the extension tube 22 and the nozzle 21 are integrally formed as in integral part. When clogging of the nozzle 21 cannot be excluded, the process of heating the nozzle 2 through the heating block 1 is bypassed due to the nozzle cannot be departed, and thus the heating block 1 and the nozzle tube 2 are disassembled through threads to replace the whole nozzle tube 2 for facilitating replacement by users themselves and reducing the risk of burns.

Furthermore, as heat will be transmitted in a direction to large surfaces, the outer diameter w2 of the extension tube 22 is smaller than the outer diameter w1 of the nozzle tube 2 and the outer diameter w3 of the connecting tube 3 for the heat of the heating block 1 can be accumulated as much as possible at the nozzle 21 of the end of the nozzle tube 21. As a result, printing materials are uniformly heated and melted only at the nozzle 21 to prevent the printing materials melted and clogged at the extension pipe 22 or connecting tube 3, and thus the print head 10 will not be clogged easily.

Figure 7:
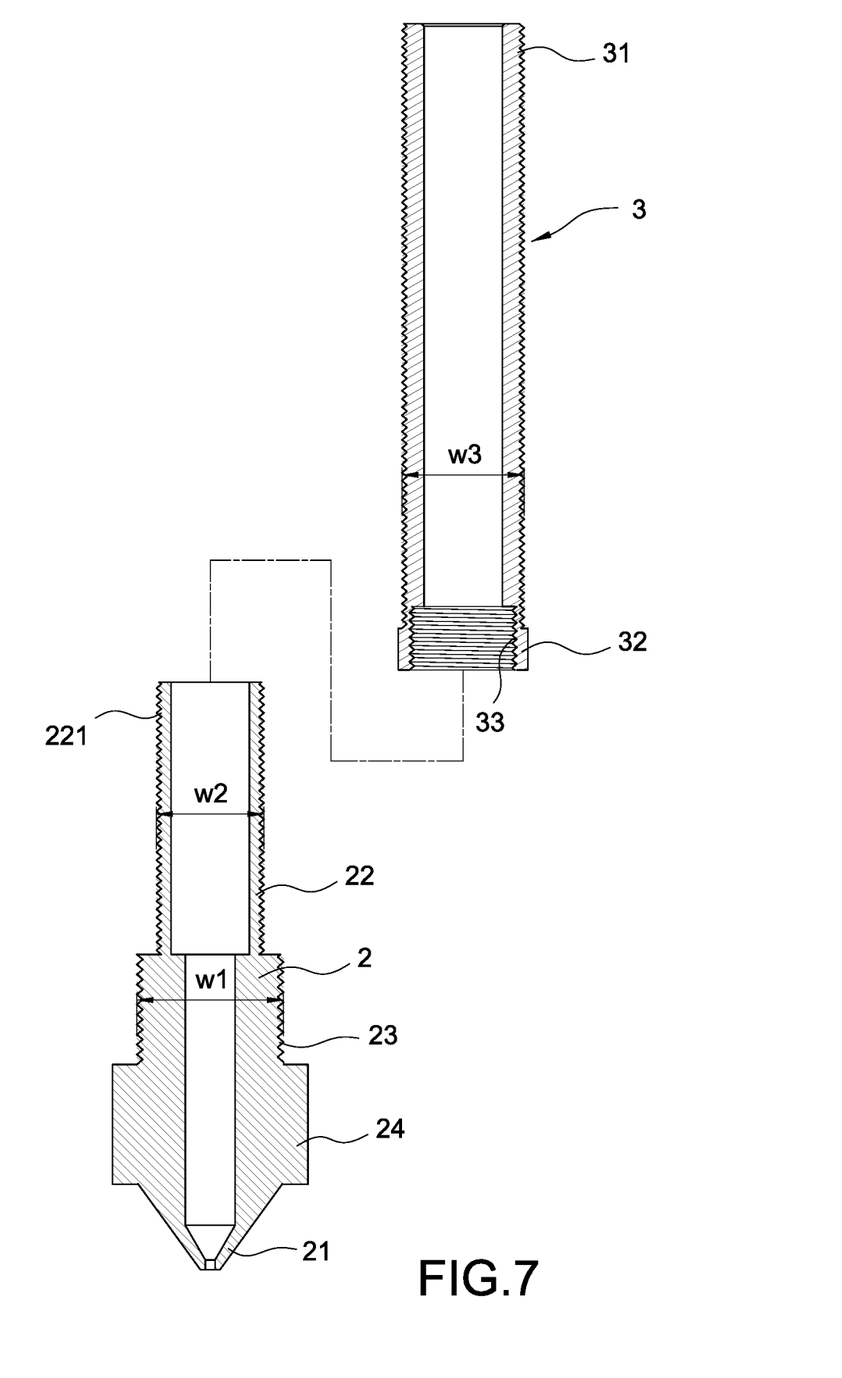
FIG. 7 is a cross sectional schematic view of a second embodiment of a nozzle tube and a connecting tube of the present invention.
Figure 8:
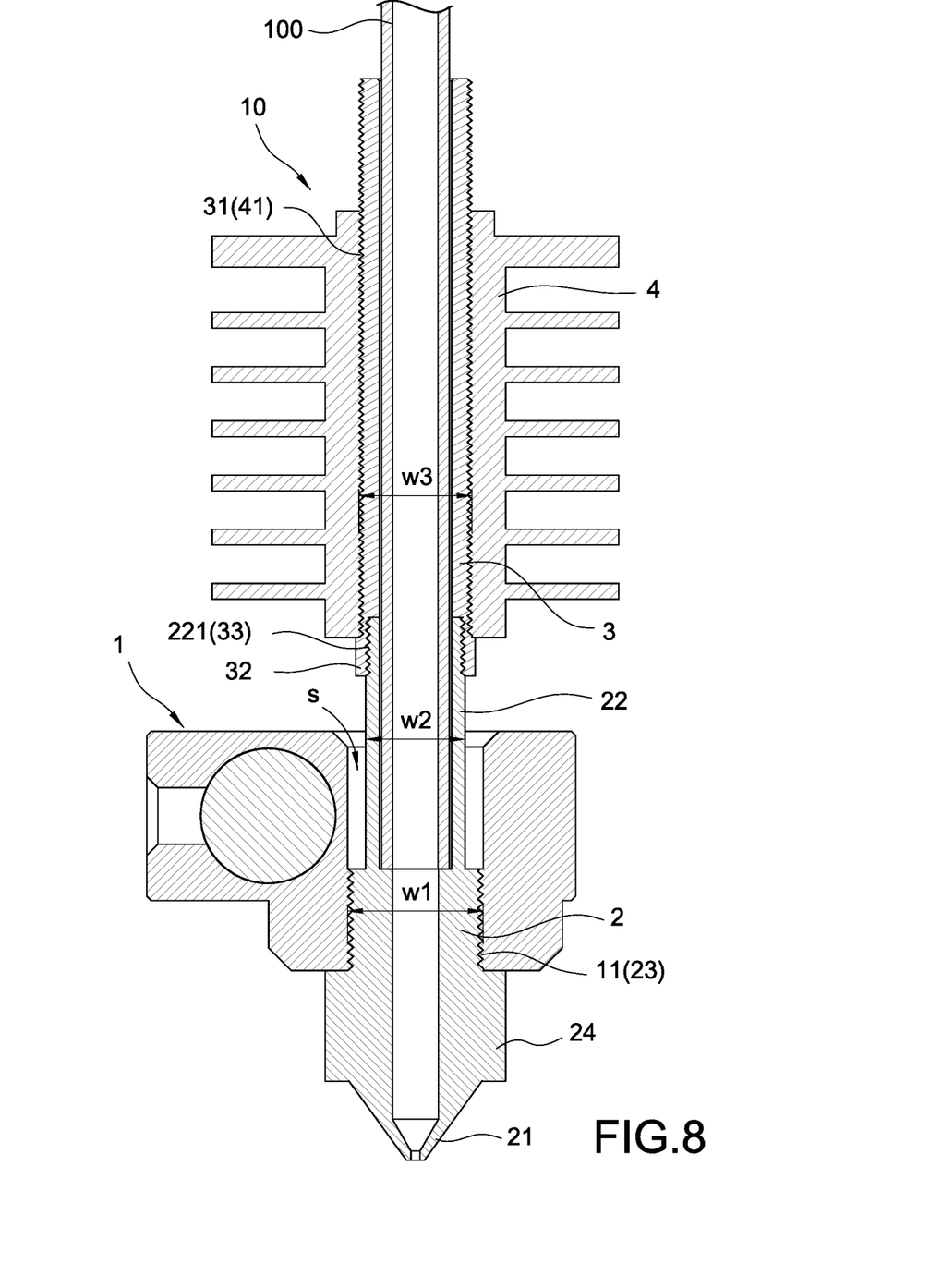
FIG. 8 is a cross sectional schematic view of a second embodiment of a print head of the present invention.

Please refer to FIG. 7 and FIG. 8, they depict a second embodiment of the print head 10 of the present invention. The second embodiment is substantially the same as the first embodiment.

The second embodiment differs from the first embodiment in that the connecting tube 3 and the extending tube 22 are not integrally formed.

Further explanation is as follows. One end of the extension tube 22 and the nozzle 22 are integrally formed. An outer periphery of the other end of the extension tube 22 has third external threads 221, and an inner periphery of the connecting tube 3 has third internal threads 33, wherein the third external threads 221 and the third external threads 33 are screwed together for combining the connecting tube 3 and the extension tube 22 instead of integrally formed. Thereby, the nozzle tube 2 disposed near the heating block 1 cannot be disassembled to achieve the same function and effects as the first embodiment; however, the connecting tube 3 and the extension tube 22 can be loosen by unscrewing, and the nozzle tube 2 can be departed from the connecting tube 3 as demands.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A print head with quick release mechanism, including:
   a heating block;
   a nozzle tube inserted in the heating block; one end of the nozzle tube having a nozzle and the other end extending to form an extension tube exposed to the heating block;
   a connecting tube connected with the extension tube, wherein an inner peripheral surface of the heating block has first internal threads, and an outer peripheral surface of the nozzle tube has first external threads; the first internal threads and the first external threads are screwed together; and
   a heat sink set, wherein the heat sink set sleeves on the connecting tube; an outer periphery of the connecting tube has second outer threads, and an inner periphery of the heat sink set has second internal threads; the second outer threads and the second internal threads are screwed together, and a helical direction of the first external threads is opposite to a helical direction of the second external threads.

2. The print head with quick release mechanism according to claim 1, wherein an outer diameter of the extension tube is smaller than an outer diameter of the nozzle tube and an outer diameter of the connecting tube.

3. The print head with quick release mechanism according to claim 1, wherein the heating block sleeves on an outer circumference of the extension tube, and a spacing is formed between the heating block and the extension tube.

4. The print head with quick release mechanism according to claim 1, wherein a protruding annular block is provided at an outer peripheral edge of an intersection of the nozzle tube and the nozzle, and the protruding annular block blocks the heating block.

5. The print head with quick release mechanism according to claim 1, wherein the connecting tube has an annular portion neighboring an outer periphery of an end of the extension tube, and the annular portion blocks the heat sink set.

6. The print head with quick release mechanism according to claim 1, wherein the connecting tube and the extension tube are integrally formed.

7. A print head with quick release mechanism, including:
   a heating block;
   a nozzle tube inserted in the heating block; one end of the nozzle tube having a nozzle and the other end extending to form an extension tube exposed to the heating block; and
   a connecting tube connected with the extension tube,
   wherein the connecting tube and the extension tube are combined with each other; an outer periphery of the extension tube has third external threads, and an inner periphery of the connecting tube has third internal threads; the third external threads and the third internal threads are screwed together.

8. The print head with quick release mechanism according to claim 1, wherein the nozzle tube is made of a stainless steel (SUS303).

9. The print head with quick release mechanism according to claim 7, wherein an outer diameter of the extension tube is smaller than an outer diameter of the nozzle tube and an outer diameter of the connecting tube.

10. The print head with quick release mechanism according to claim 7, wherein the heating block sleeves on an outer circumference of the extension tube, and a spacing is formed between the heating block and the extension tube.

11. The print head with quick release mechanism according to claim 7, wherein an inner peripheral surface of the heating block has first internal threads, and an outer peripheral surface of the nozzle tube has first external threads; the first internal threads and the first external threads are screwed together.

12. The print head with quick release mechanism according to claim 11, wherein a protruding annular block is provided at an outer peripheral edge of an intersection of the nozzle tube and the nozzle, and the protruding annular block blocks the heating block.

13. The print head with quick release mechanism according to claim 11, further including a heat sink set, wherein the heat sink set sleeves on the connecting tube; an outer periphery of the connecting tube has second outer threads, and an inner periphery of the heat sink set has second internal threads; the second outer threads and the second internal threads are screwed together, and a helical direction of the first external threads is opposite to a helical direction of the second external threads.

14. The print head with quick release mechanism according to claim 13, wherein the connecting tube has an annular portion neighboring an outer periphery of an end of the extension tube, and the annular portion blocks the heat sink set.

15. The print head with quick release mechanism according to claim 7, wherein the nozzle tube is made of a stainless steel (SUS303).

* * * * *